UNITED STATES PATENT OFFICE.

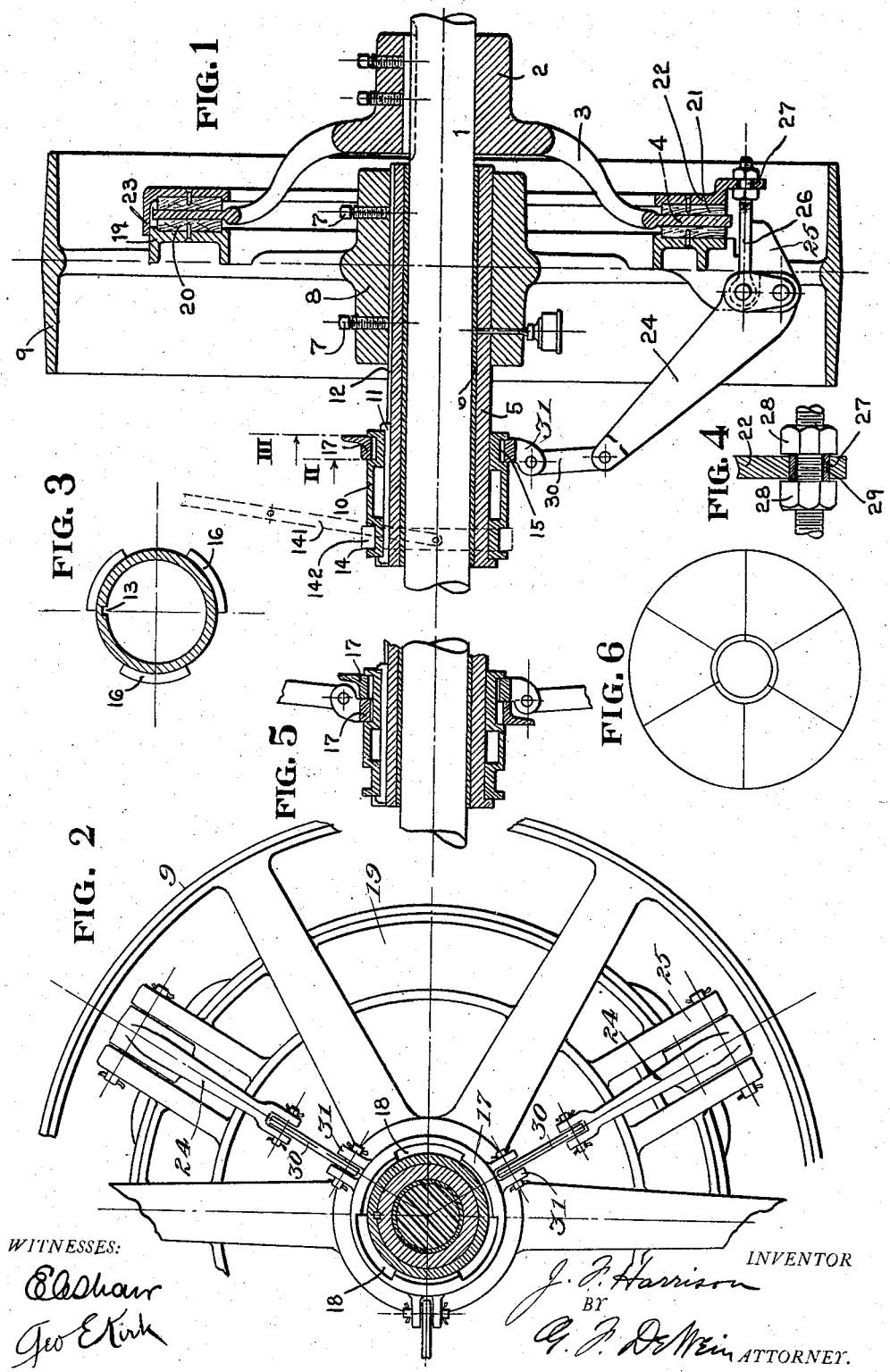

JOHN F. HARRISON, OF MILWAUKEE, WISCONSIN, ASSIGNOR TO ALLIS-CHALMERS COMPANY, OF MILWAUKEE, WISCONSIN, A CORPORATION OF NEW JERSEY.

FRICTION-CLUTCH.

No. 867,502.  Specification of Letters Patent.  Patented Oct. 1, 1907.

Application filed January 20, 1906. Serial No. 296,967.

*To all whom it may concern:*

Be it known that I, JOHN F. HARRISON, a citizen of the United States, residing at Milwaukee, in the county of Milwaukee and State of Wisconsin, have invented certain new and useful Improvements in Friction-Clutches, of which the following is a specification.

This invention relates to a friction clutch, and the object is to provide a clutch in which the connections automatically compensate for any possible unequal strains which might be caused in assembling the parts, and which might take place during the operation of the clutch.

One adaptation of the invention is disclosed in the accompanying drawing, in which,—

Figure 1 is a vertical longitudinal section; Fig. 2 is a broken elevation, partly in transverse section, the section being taken on line II, Fig. 1, the direction of the arrow; Fig. 3 is a transverse sectional view of the collar taken on the line III, Fig. 1, in the direction of the arrow; Fig. 4 is a broken sectional view of detail showing the connection between the arm and the brake ring; Fig. 5 is a broken longitudinal sectional view of the sleeve, collar, rings and linkage of a modification; Fig. 6 is a diagrammatic view showing the manner of connecting the linkage to the rings in the modification shown in Fig. 5.

Referring to the drawings: The clutch is shown as applied to a shaft 1 upon which is keyed a hub 2 and spider 3 supporting a transverse disk or ring 4. A sleeve 5, having Babbitt metal lining 6, is freely supported on the shaft 1 adjacent the hub 2. Upon one end of the sleeve 5 is firmly secured by means of set screws 7, 7, the hub 8 of a pulley 9. Upon the other end of the sleeve 5 is splined a collar 10 by means of the key 11, groove 12 and keyway 13, see Fig. 3. At one end of the collar 10 is formed an annular groove 14 for the application of a split ring, 142, to which is attached in well-known manner an operating lever, 141, At the other end of the collar 10 is formed an annular groove 15. The circumferential flange which is formed adjacent the annular groove 15 is notched to form lugs 16, 16, see Fig. 3. These lugs are equally spaced about the periphery of the collar 10. A ring 17 coacts with the annular groove 15 of the collar 10. The ring 17 is formed with a plurality of recesses 18, 18, see Fig. 2, equal in number to the lugs 16. The ring 17 is of internal diameter slightly greater than the diameter of the sleeve 10 at the bottom of the annular groove 15, so that the ring 17 may have free radial adjustment on the collar 10. The circumferential length of the lugs 16 is slightly less than the circumferential length of the recesses 18. The object of this proportioning of parts is to allow the ring 17 to be assembled in its place upon the collar 10 by placing the lugs 16 in registration with the recesses 18, then sliding the ring 17 into the annular groove 15, and then partially relatively rotating these two parts. The ring 17 is dissembled from the collar 10 by reversing this series of operations.

Supported on the arms of the pulley 9 is an annular portion 19 upon which is mounted an annular wooden lining 20. This lining 20 is brought into coaction with ring 4. Upon the other side of the ring 4, coacts a second wooden lining 21, carried by a ring 22, having a flange 23 which circumferentially coacts with the annular portion 19 and is longitudinally slidable thereon. A plurality of arms 24, 24, is pivoted to a series of lugs 25, 25, formed on the annular portion 19. Bolts 26, 26, are pivotally mounted at one end in recesses, shown in dotted lines, Fig. 1, in the arms 24. The other ends of bolts 26 pass through holes 27, 27, see Fig. 4, in the ring 22, and are connected to ring 22 by means of nuts 28 screwing against the ends of a ferrule 29 which is positioned upon the bolts 26 and within the holes 27. The length of the ferrule is slightly greater than the thickness of the ring 22. This will prevent any binding of the nuts 28 directly upon the ring 22. The other ends of the arms 24 are pivotally connected by links 30, 30, to lugs 31, 31, formed on the ring 17.

From the description above, it is clear that the ring 17 may be easily placed in position on the collar 10 by causing the lugs 16 to register with the recesses 18, sliding the parts longitudinally together, then causing a slight relative rotation and then connecting up to the arms 24 by means of linkage 30. Any inaccuracy in the connections will automatically be compensated for by the relative radial play between ring 17 and collar 10. The strain upon the arms 24 in the operation of the device, is therefore equalized.

In the operation of the clutch, the collar 10 is shifted longitudinally, causing a force to be applied to the arms 24 which spring upon their pivotal mounting on the pulley, thus drawing the bolts longitudinally. This action will cause the ring 22 to approach or recede from the annular portion 19, thus clamping or releasing, as the case may be, the ring 4 by the frictional engagement or disengagement thereof by the wooden liners 20, 21.

The modification illustrated in Figs. 5 and 6 differs from the other embodiment of the invention as illustrated, merely in the plurality of rings 17. In the modification shown, two rings are used and these are connected, as shown diagrammatically in Fig. 6, to the arms 24 by alternating the ring connections of these arms; that is, the arms alternately connect to the rings or in recurring series. This will insure the connection in the same order of the arms to the rings; that is, in proceeding around the circumference the connection of the arms to the rings is found to be in the same order throughout or in similar recurring series of connections.

The advantage of the construction shown in the modification, Figs. 5 and 6, is to more perfectly distribute the strains to which the clutch is subjected during operation.

What is claimed and it is desired to secure by Letters Patent is:

1. A shaft, a means rotating with the shaft, a member loose relative to the shaft, a collar longitudinally slidable on the member, an element coacting with the collar and disengageable therefrom on relative rotation and longitudinal separation of the element and collar, clamping means on the member for causing rotation of the member with the shaft, and linkage connecting the element and the clamping means.

2. A shaft, a member loose relative to the shaft, a collar movable but nonrotatable on the member, a recessed ring coacting with the collar, lugs on the collar registrable with the ring recesses for assembling the collar and ring, clamping means on the member for causing rotation of the member with the shaft, and linkage connecting the ring and the clamping means and, in combination with the connection between the collar and the member, preventing registration of the lugs and recesses.

3. A shaft, a member, a grooved collar movable on the member, a plurality of radially loose rings in the groove, operable means for connecting the shaft and the member, and a plurality of links connecting the means to the rings in recurring series.

In testimony whereof I affix my signature in presence of two witnesses.

JOHN F. HARRISON.

Witnesses:
G. F. DE WEIN,
GEO. E. KIRK.